United States Patent [19]

Pazdirek

[11] Patent Number: 5,406,033
[45] Date of Patent: * Apr. 11, 1995

[54] INSULATOR STRUCTURE AND METHOD OF CONSTRUCTION

[75] Inventor: Jiri Pazdirek, Schaumburg, Ill.

[73] Assignee: MacLean-Fogg Company, Mundelein, Ill.

[*] Notice: The portion of the term of this patent subsequent to Dec. 20, 2011 has been disclaimed.

[21] Appl. No.: 106,099

[22] Filed: Aug. 12, 1993

Related U.S. Application Data

[63] Continuation-in-part of Ser. No. 939,004, Sep. 2, 1992.

[51] Int. Cl.$^6$ .................................... H01B 17/06
[52] U.S. Cl. .................................. 174/176; 174/167; 174/178; 174/209
[58] Field of Search .............. 174/40 R, 44, 45 R, 174/45 TD, 137 R, 137 A, 137 B, 138 E, 139, 140 R, 140 L, 144, 145, 146, 154–157, 158 R, 160, 162, 167, 168, 172, 174, 175, 176–181, 183–185, 194–196, 198, 200, 201, 207–212; 248/49, 58, 62, 63, 67.7; 264/239, 241, 257, 258

[56] References Cited

U.S. PATENT DOCUMENTS

| | | | |
|---|---|---|---|
| 2,602,766 | 7/1952 | Francis | 87/6 |
| 2,684,318 | 7/1954 | Meek | 156/180 |
| 2,852,425 | 9/1958 | Shobert | 156/180 |
| 2,970,186 | 1/1961 | Von Platen | 174/179 |
| 2,983,182 | 5/1961 | Shobert | 87/34 |
| 3,007,497 | 11/1961 | Shobert | 138/125 |
| 3,014,088 | 12/1961 | Austin et al. | 174/179 |
| 3,033,729 | 5/1962 | Shobert | 156/149 |
| 3,134,164 | 5/1964 | Hocks | 29/631 |
| 3,328,515 | 6/1967 | Vose | 174/140 S |
| 3,571,492 | 3/1971 | Clark | 174/178 |
| 3,586,758 | 6/1971 | Harmon | 174/158 R |
| 3,592,959 | 7/1971 | Dougherty | 174/178 |
| 3,739,457 | 6/1973 | Davis | 29/460 |
| 3,878,321 | 4/1975 | Ely | 174/144 |
| 3,898,372 | 8/1975 | Kalb | 174/179 |
| 3,971,128 | 7/1976 | Rebosio | 29/631 |
| 4,057,687 | 11/1977 | Willem | 174/179 |
| 4,198,538 | 4/1980 | Lusk | 174/140 S |
| 4,217,466 | 8/1980 | Kuhl | 174/209 |
| 4,246,696 | 1/1981 | Bauer et al. | 29/631 |
| 4,296,276 | 10/1981 | Ishihara et al. | 174/179 |
| 4,373,113 | 2/1983 | Winkler et al. | 174/179 |
| 4,423,285 | 12/1983 | Thuillier et al. | 174/146 |
| 4,427,843 | 1/1984 | Ishihara et al. | 174/140 S |
| 4,481,056 | 11/1984 | Kuhl | 156/180 |
| 4,491,687 | 1/1985 | Kaczerginski et al. | 174/178 |
| 4,505,033 | 3/1985 | Wheeler | 29/631 |
| 4,656,555 | 4/1987 | Raudagaugh | 174/178 X |
| 4,671,336 | 6/1987 | Anahara et al. | 164/110 |
| 4,857,124 | 8/1989 | Shobert et al. | 156/149 |
| 4,892,461 | 1/1990 | Matsumoto et al. | 416/134 A |
| 4,958,049 | 9/1990 | Alfieri et al. | 174/209 |
| 4,992,313 | 2/1991 | Shobert et al. | 428/36.1 |
| 5,047,106 | 9/1991 | Matsumoto et al. | 156/169 |
| 5,220,134 | 6/1993 | Novel et al. | 174/179 |

Primary Examiner—Leo P. Picard
Assistant Examiner—Christopher Horgan
Attorney, Agent, or Firm—Willian Brinks Hofer Gilson & Lione

[57] ABSTRACT

A composite link and insulator, and method of construction, includes a fiberglass body. The body is formed by coating glass fibers with a liquid resin and winding the fibers around a plurality of tubular fittings or bushings in two layers, a first extending longitudinally of the body and the second transversely and around the first. A polymer shield layer and weathersheds are injection molded over the fiberglass body to create an insulator. The insulator may also be provided with stiffening plastic inserts at either end for increasing strength without adding significantly to the insulator's overall weight.

31 Claims, 5 Drawing Sheets

INSULATOR STRUCTURE AND METHOD OF CONSTRUCTION

STATEMENT OF RELATED APPLICATIONS

This application is a continuation-in-part of a copending application entitled "COMPOSITE INSULATOR STRUCTURE AND METHOD OF CONSTRUCTION", filed Sep. 2, 1992, and bearing Ser. No. 07/939,004. The entire disclosure of this application is incorporated herein by reference.

FIELD OF THE INVENTION

This invention relates in general to a link which may be used as an electric power transmission line insulator. More particularly, it relates to an improved link and insulator, and method of construction.

BACKGROUND OF THE INVENTION

Insulators are used to prevent the loss of electric charge or current from conductors in electric power transmission lines. A typical insulator is made from a material which has a very high resistance to electric current, so that the current flow through it is usually negligible. One type of insulator is referred to as a suspension insulator. It suspends a transmission line from an overhead support. A particular type of suspension insulator is referred to as a composite insulator.

A known composite insulator may include a coated fiberglass rod surrounded by weathersheds made from a highly insulating material. (See, for example, Kuhl U.S. Pat. No. 4,217,466, or, Bauer U.S. Pat. No. 4,246,696). Such insulators are referred to as "composite" because the weathersheds and the rod are made from different materials especially suited for the distinct functions of the two components. In general, the rod takes the mechanical stress and contributes to the overall insulation, while the majority of the insulation is provided by the weathersheds.

Another type of insulator is referred to as a guy strain insulator. It provides insulation for guy wires attached to the transmission line's support structure. One of the requirements for guy strain insulators is that they be capable of providing torque resistance.

Insulators may be connected to and carry the power line in a variety of ways, including "suspension," "deadend," "horizontal" and "post" configurations. In all of these configurations, metal fittings are provided at each end of the rod for connecting the rod to either a support pylon or a power line. Numerous U.S. Patents disclose structure and methods for mounting such fittings on an insulator. A partial list of such patents includes Wheeler U.S. Pat. No. 4,505,033; Kaczerginski et al. U.S. Pat. No. 4,491,687; Dougherty U.S. Pat. No. 3,592,959; Von Platen U.S. Pat. No. 2,970,186; Hocks U.S. Pat. No. 3,134,164; Ely U.S. Pat. No. 3,878,321; Austin et al. U.S. Pat. No. 3,014,088; Rebosio U.S. Pat. No. 3,971,128; Vose U.S. Pat. No. 3,328,515; Ishihara et al. U.S. Pat. No. 4,296,276; Harmon U.S. Pat. No. 3,586,758; Willem U.S. Pat. No. 4,057,687; Lusk U.S. Pat. No. 4,198,538; Kalb U.S. Pat. No. 3,898,372; Thuillier et al. U.S. Pat. No. 4,423,285; and Winkler et al. U.S. Pat. No. 4,373,113.

Wheeler U.S. Pat. No. 4,505,033 discloses a composite insulator comprising a fiberglass rod partially covered with an elastomer sheath. A metal fitting is mounted on the exposed end of the rod for connecting the insulator to associated members. The fitting includes a head formed with an oval eye for attachment to a support or to a high voltage conductor. The fitting may be adhesive bonded to the rod, or it may be swaged to the rod.

Kaczerginski U.S. Pat. No. 4,491,687 discloses a composite insulator comprising a central mandrel made of insulating foam with two metal end pieces glued to the mandrel. Resin-impregnated fibers are wound around the end pieces and mandrel. The winding is then covered with a resilient, insulating covering.

Dougherty U.S. Pat. No. 3,592,959 discloses a prestressed, ceramic insulator assembly including an endless fiberglass loop. A return bend portion of the loop is supported in a U-shaped saddle member, which is in alignment with an end cap.

Von Platen U.S. Pat. No. 2,970,186 discloses an electric insulator including a member made from thin vitreous wires. The member is wound in a closed loop, the ends of which rest against the corresponding contact surfaces of two separate parts. Each of these parts is screwed into a separate end cap.

There are a number of problems associated with many such known insulators. For example, the fittings are often relatively large components cast from metal and, thus, are heavy and expensive. Where a fitting is swaged to a fiberglass portion of an insulator, fabrication is difficult because it is difficult to apply the correct amount of pressure to the metal, which is ductile, without shattering the glass, which is considerably less ductile. Where fiberglass is glued to metal, it is difficult to find a suitable adhesive which will join the metal-resin-glass interface and not break down during use.

SUMMARY OF INVENTION

A primary object of the present invention is to provide an improved composite link.

It is also an object of the present invention to provide an improved insulator capable of being used as a guy strain insulator.

It is also an object of the present invention to provide an improved insulator capable of providing improved torque resistance.

It is also an object to provide an improved composite insulator.

It is also an object to provide an insulator that is strong, lightweight and easy to manufacture.

It is another object to provide an insulator having an improved strength-to-weight ratio.

It is still another object to provide an insulator fabricated primarily of fiberglass.

It is yet another object to provide an insulator having simple and inexpensive fittings for connecting the insulator to associated members.

It is a further object to provide an improved method of constructing a composite link and insulator.

The foregoing and other objects are realized in accordance with the present invention by providing an improved composite insulator in which glass fibers are coated with a liquid resin and wound in a prescribed manner around tubular bushings or fittings to form a fiber-glass body. The bushings are mounted in a suitable fixture for winding. After winding, the liquid resin is allowed to cure. After it has cured, the body is placed in a die which, in closing, masks the exposed surfaces of the bushings. Then a polymer, such as silicone rubber, is molded over the cured fiberglass body to form the finished insulator. The insulator is primarily fiberglass, from end to end. The bushings, which are embedded in the insulator body during manufacture, provide means for connecting the insulator at both ends.

In another embodiment of the invention, an insulator is provided in which glass fibers are coated with a liquid resin and wound in a prescribed manner around tubular bushings or fittings to form a fiberglass body. The bushings are mounted in a suitable fixture for winding. After winding, the liquid resin is allowed to cure. After it has cured, a protective coating is applied to the body by any conventional process such as dipping or spraying. The protective coating protects the body from the negative effects of UV rays and extreme weather conditions. The insulator is primarily fiberglass, from end to end. The bushings, which are embedded in the insulator body during manufacture, provide means for connecting the insulator at both ends. This insulator may be advantageously used as a guy strain insulator.

In still another embodiment of the invention, an insulator is provided in which glass fibers are coated with a liquid resin and wound in a prescribed manner around tubular bushings or fittings to form a fiberglass body. The bushings are mounted in a suitable fixture for winding. Lightweight inserts are secured around at least one of the bushings for guiding the glass fibers to and around the bushing, and for providing added torque resistance to the finished fiberglass body. After winding, the liquid resin is allowed to cure. After it has cured, a protective coating is applied to the body by any conventional process such as dipping or spraying. The protective coating protects the body from the negative effects of UV rays and extreme weather conditions. The insulator is primarily fiberglass, from end to end. The bushings, which are embedded in the insulator body during manufacture, provide means for connecting the insulator at both ends. The lightweight inserts, which are also embedded in the insulator body during manufacture, guide the glass fibers to and around the bushing, and also provide added torque resistance to the finished fiberglass body. This insulator is advantageously used as a guy strain insulator.

BRIEF DESCRIPTION OF THE DRAWINGS

The invention, including its construction and method of operation, together with additional objects and advantages thereof, is illustrated in the following drawings in which.

DESCRIPTION OF THE PREFERRED EMBODIMENTS

Figures 1, 2:
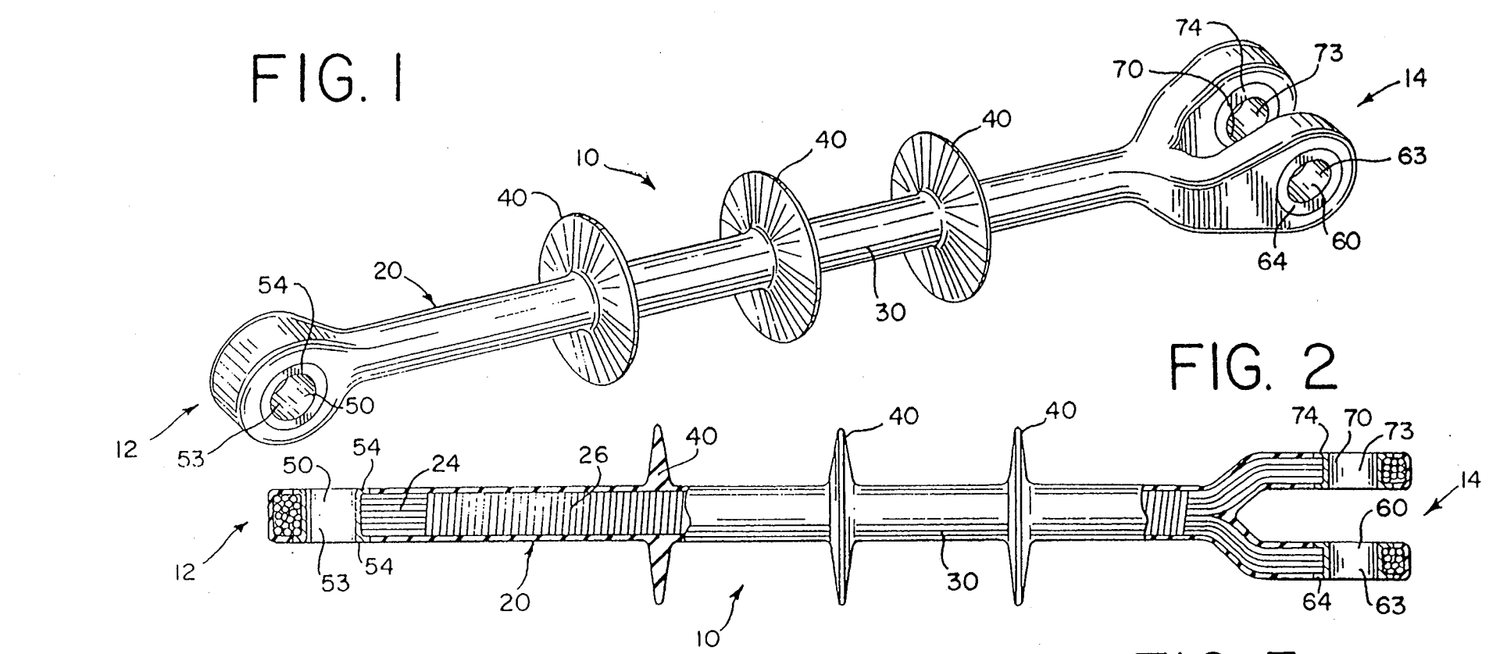
FIG. 1 is a perspective view of a composite insulator embodying features of the present invention.
FIG. 2 is a top plan view, partially in section, of the composite insulator shown in FIG. 1.

FIG. 1 illustrates a composite insulator 10 embodying features of the present invention. The insulator 10 may be used to insulate any of a variety of electric power transmission lines (not shown), including high tension lines (typically 100–400 KV) and distribution lines (typically 15–35 KV).

In general, a transmission line includes a set of conductors, usually bare, which are carried by a series of support structures (not shown). For high-tension lines, the support structures may be wooden H-frames or steel towers, for example. For distribution lines, the support structures may be conventional wooden poles.

The insulator 10 may connect the power line to the support structures in a variety of known connection configurations, including "suspension," "deadend" and "post" connections. The insulator 10 is essentially the same regardless of the manner in which it is connected to the transmission line or the support structure.

Figure 3:
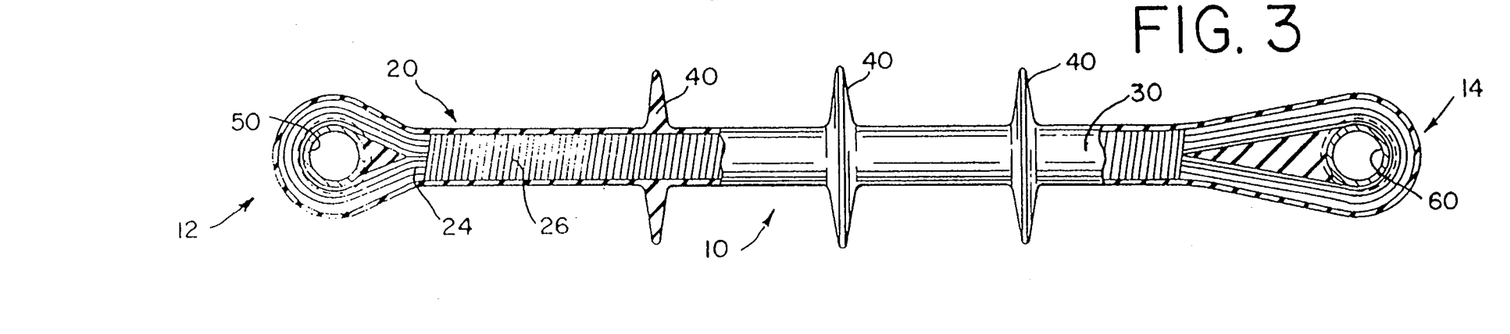
FIG. 3 is a front elevational view, partially in section, of the composite insulator shown in FIG. 1.

Referring now also to FIGS. 2 and 3, the composite insulator 10 comprises a body 20, a shield layer 30 and a plurality of weathersheds 40. In the disclosed embodiment, the weathersheds 40 are formed integrally with the shield layer 30. Alternatively, the weathersheds 40 may be formed separately and attached to the shield layer 30. Suitable materials for the illustrated shield layer 30 and integral weathersheds 40 are described in Kuhl U.S. Pat. No. 4,217,466, and Bauer et al. U.S. Pat. No. 4,246,696. The entire disclosure of each of these applications is incorporated herein by reference.

A tubular bushing 50 is embedded in a tongue end 12 of the insulator 10 and similar bushings 60 and 70 are embedded in each arm of a yoke end 14. The bushings 50, 60 and 70 provide means for connecting the insulator 10 to support pylons (not shown) or transmission lines (not shown), for example. For reasons hereinafter discussed, the bushing 50 is approximately twice as long as bushing 60 and 70.

The insulator body 20, which may have independent utility as a link, is made from a strand of resin-coated glass fibers which is wound longitudinally between and around the bushings 50, 60 and 70 to form a primary layer 24 of resin coated fibers. The strand is then wound transversely around the layer 24 to form a secondary layer 26 of resin coated fibers. This winding step is carried out using a known winding method. In this regard, for a discussion of filament winding technology, including a listing of patents related thereto, reference is made to *Filament Winding,* a book by Peters, Humphrey and Foral, published by SAMPE, the Society of Advanced Materials and Process Engineers, the contents of which are incorporated herein by reference.

Although a variety of glass fibers would be suitable, the preferred fiber is "E-glass". It is an inexpensive, electrical grade fiber having high mechanical strength and high dielectric strength.

The strand is coated before winding with a controlled amount of liquid resin, such as a polyester, vinylester, epoxy, phenolic, or other material having similar properties. The resin must provide a good mechanical bond and have high dielectric strength. It must also be suitable for high temperature molding of the shield layer 30 and the weathersheds 40.

Referring now to FIGS. 4a-c and 5, details of the construction method for the insulator body 20 are illustrated. Initially, the tubular bushings, 50, 60, 70, are secured in the relative positions shown in FIG. 4a by a fixture (not shown) which does not allow relative movement of the bushings during fabrication of the body 20.

Figure 4A:
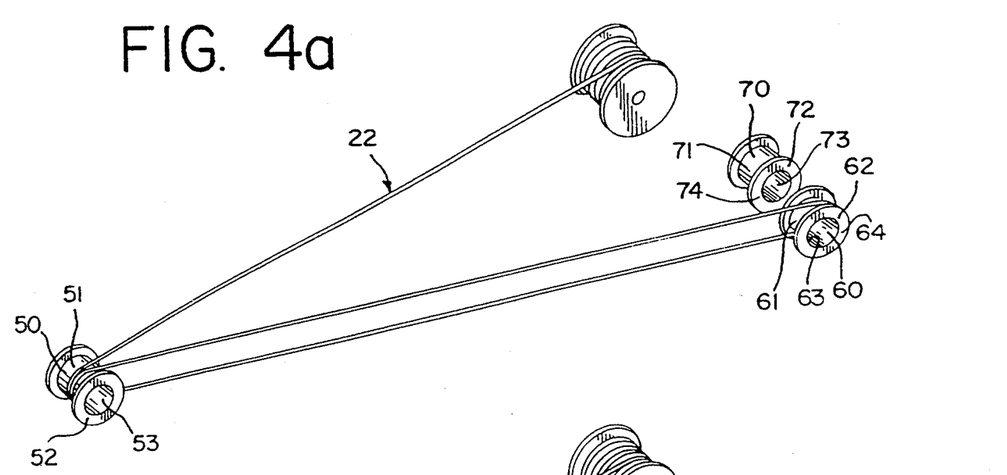
FIGS. 4a–c illustrate steps in the method of fabricating the composite insulator shown in FIGS. 1, 2 and 3.

The bushings 60 and 70 are aligned axially and spaced apart. The distance L from the axis of the bushing 50 to the common axis of the bushings 60 or 70 represents the effective length of the insulator structure 10 when it is fabricated.

Each bushing 50, 60 and 70 includes a cylindrical section 51, 61, 71 of tubing having identical flanges 52, 62 and 72 formed radially outwardly at its free ends. The bushing sections 51, 61 and 71 have corresponding inner surfaces 53, 63 and 73, and the flanges 52, 62 and 72 have corresponding outer faces 54, 64 and 74. The bushings are preferably made of metal, but may be made from any material having similar strength and wear characteristics, including a polymer.

Figure 4B:
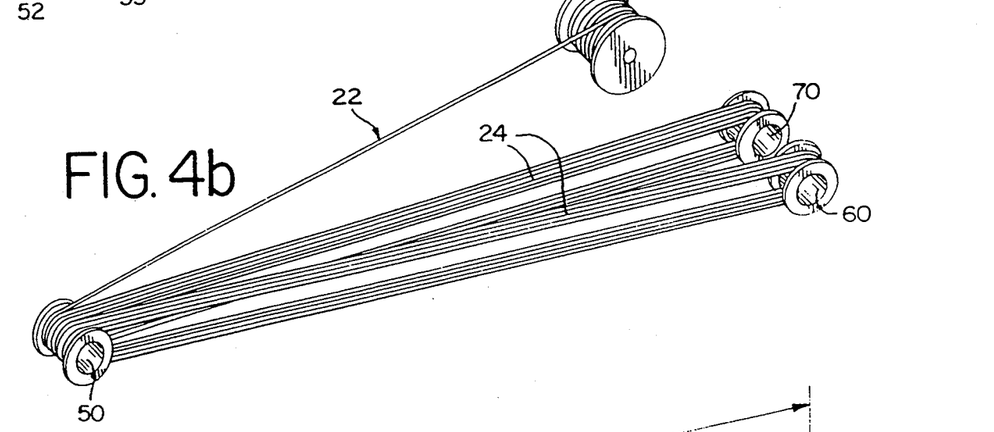

According to the invention, a continuous strand 22 of glass fibers is "wetted" in a controlled manner in a liquid resin bath (not shown), and then wound between and around bushings 50, 60 and 70, as shown in FIGS. 4a and 4b. The resin migrates through the strand 22 to contact the individual fibers. In the alternative the strand 22 may be pre-impregnated by conventional techniques. The strand 22 may be a single strand, as shown, or multiple strands or a crosswoven tape of strands may be used as an alternative.

The surfaces 53, 63 and 73, and the faces 54, 64 and 74 of the respective bushings are covered by the fixture or other means during winding. This prevents them from being fouled with resin during this step.

The strand 22 is wound from the bushing 50 to and around the bushings 60 and 70, alternating between the latter. It is wound until it covers the cylindrical sections 51, 61, and 71 of the bushings across their entire width, forming the primary layer 24 to a thickness approximately twice the height of the flanges 52, 62, and 72 (see FIG. 5). The bushing 50 is of sufficient width to accommodate windings for this primary layer 24 of glass fibers on both bushings 60 and 70.

Figure 4C:
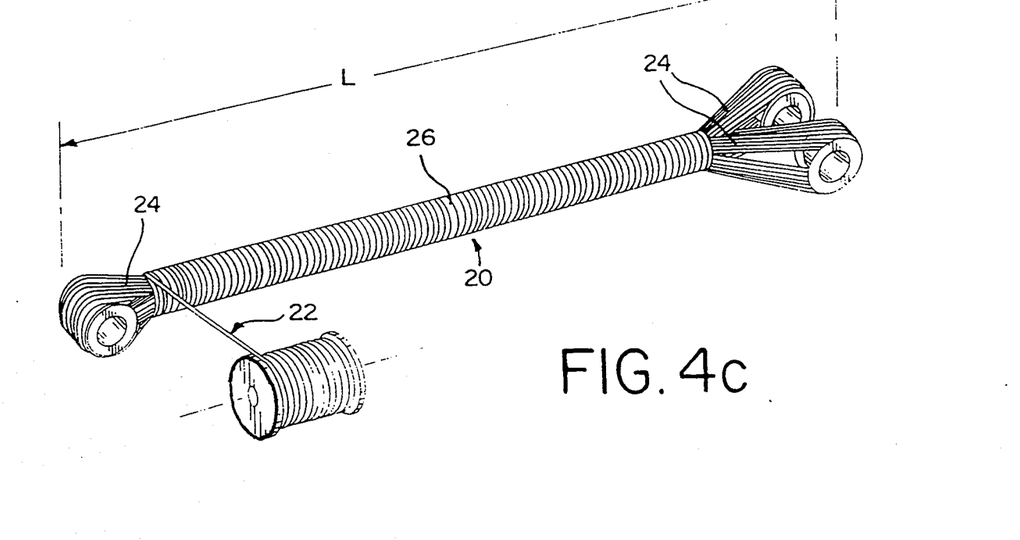

FIG. 4c illustrates further winding of the strand 22 to form the secondary layer 26 of glass fibers. To form this secondary layer 26, the same strand 22 is brought across the layer 24 from one end of the bushing 50 and then around the primary layer 24 between bushing 50 and bushings 60, 70. The strand 22 is pulled, in tension, against the primary layer 24 as it is wound. This draws the primary layer 24 inward from its original path around the bushings 50, 60 and 70 and squeezes air out of the primary layer 24. It also creates the fiberglass body 20 shape shown in FIG. 4c.

Figures 5, 6:
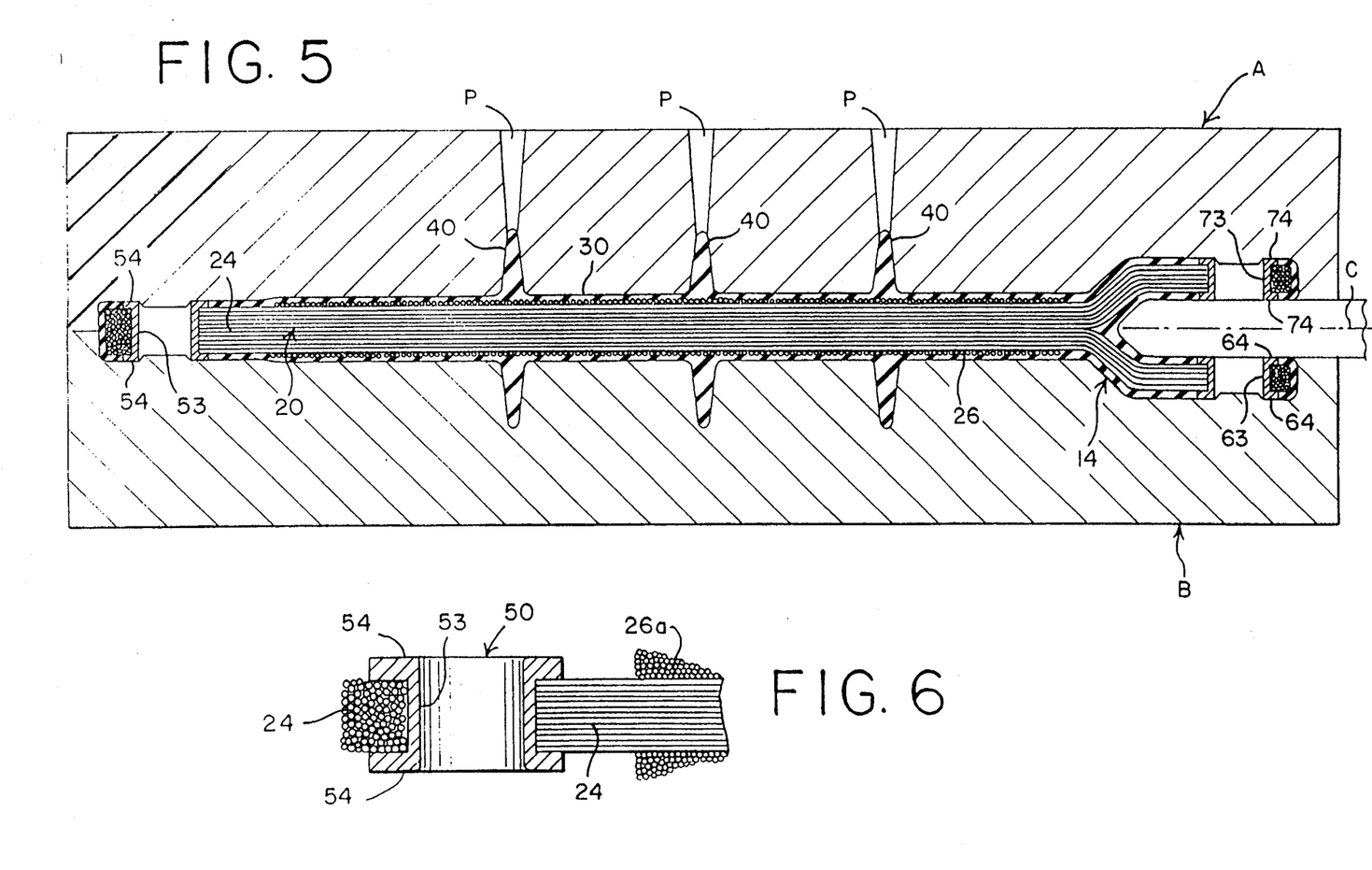
FIG. 5 illustrates an injection molding die closed on the fiberglass body for molding.
FIG. 6 schematically illustrates a portion of the body adjacent its single bushing end to show a modified form of glass fiber winding at that point.

FIG. 6 illustrates a modified form of the windings of the secondary layer 26 immediately adjacent the bushing 50. There it will be seen that multiple windings of the strand 22 are applied to create a thicker layer 26a adjacent the bushing 50, where the primary layer 24 splits to pass around the bushing. This provides added strength at this point.

After the strand 22 is wound to form the body 20, the liquid resin is allowed to hard cure. This secures the bushings 50, 60, 70 in the tongue end 12 and the yoke end 14, respectively. If desired, the resin may be oven cured to accelerate the manufacturing process.

Turning to FIG. 5, the shield layer 30 and weathersheds 40, both made of a polymer such as silicone rubber, are then injection molded over the body 20 to completely cover the layers 24 and 26. A molding die is constructed so that its upper and lower mold sections A and B engage and mask the outwardly facing, exposed metal faces 54, 64 and 74 of the bushings 50, 60 and 70, to cover them during molding. A retractable core C is inserted between the arms of the yoke end 14 of the insulator body 20 before the mold sections are closed and it engages and masks the inwardly facing exposed metal faces 64 and 74 of the bushings 60 and 70 when the mold sections A and B close and force the bushings 60 and 70 into engagement with the core. As a result, these faces and surfaces 53, 63 and 73 remain exposed on the finished insulator structure 10.

Silicone rubber is then injected in a conventional manner through ports P, for example, to form the shield layer 30 and weathersheds 40. Although injection molding is used in the aforedescribed example, other molding techniques might also be used, as well as other molding materials.

The tensile strength of the rod is imparted primarily by the fibers in the strand 22. According to the invention, the fibers constitute the largest part of the cross section of the body. The preferred ratio of glass fiber to resin is approximately seventy percent to thirty percent.

Figures 7, 8:
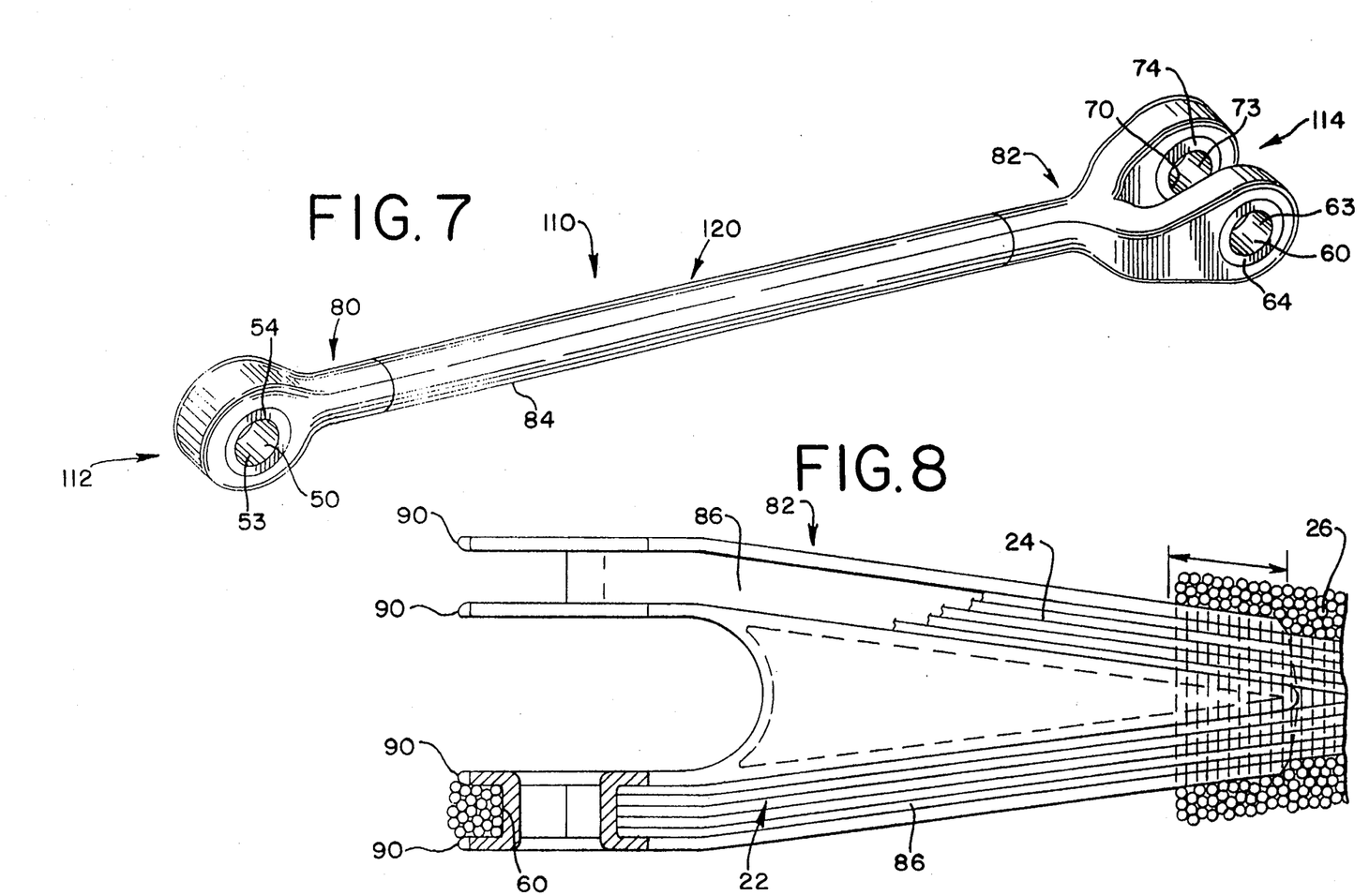
FIG. 7 is a perspective view of another insulator embodying features of the present invention.
FIG. 8 is a top plan view, partially in section, of one end of the insulator shown in FIG. 7.

Another embodiment of the insulator 10 of the present invention is illustrated at 110 in FIG. 7. This insulator 110 includes the same basic fiberglass wound construction as the insulator 10 shown in FIG. 1. The insulator 110 may be used to insulate any of a variety of electric power transmission lines (not shown). Preferably, the insulator 110 is attached to a guy wire (not shown) and used as a guy strain insulator.

The insulator 110 may be connected to the guy wire in a variety of known connection configurations, including the mechanical holding strandvise. The insulator 110 is essentially the same regardless of the manner in which it is connected to the guy wire.

Referring again to FIG. 7, the insulator 110 includes a body 120 having a tongue end 112 and a yoke end 114. As with the insulator 10, a tubular bushing 50 is embedded in the tongue end 112, and similar bushings 60 and 70 are embedded in each arm of the yoke end 114. The bushings 50, 60 and 70 provide means for connecting the insulator 110 to the mechanical holding strandvise, for example.

The insulator 110 further includes a tongue stiffening insert 80 and a yoke stiffening insert 82. The tongue insert 80 is embedded in the tongue end 112 of the insulator 110, and the yoke insert 82 is embedded in the yoke end 114 of the insulator 110. The yoke insert 82 is illustrated in detail in FIGS. 8 to 11.

Initially, the inserts 80, 82 are placed over the bushings 50, 60, 70 during manufacture, and strands of resin-coated fibers are wound over and around the insert-bushing combinations in the same manner as illustrated in FIGS. 4a to 4c for the bushings alone. A protective coating is applied to the body 120 to form the completed insulator 110. The coating is preferably of the type that provides protection from outside elements such as UV rays and severe weather. Suitable coatings include polyurethane based paint.

The stiffening inserts 80, 82 provide additional torque resistance, thus making the insulator 110 particularly useful as a guy strain insulator. The inserts 80, 82 are preferably made of a material that is strong enough to provide the desired strength characteristics and yet lightweight enough to not add significantly to the weight of the insulator 110. Suitable insert materials include plastic, such as nylon.

Turning now to FIGS. 8-11, additional details of the yoke insert 82 will now be described. The yoke insert 82 is substantially the same as the tongue insert 80 with the exception of the additional grove provided in the yoke insert 82. Accordingly, the following description applies equally to the tongue insert 80.

As illustrated in FIG. 8, the yoke insert 82 includes a set of groves or channels 86 that form guiding paths for winding the primary layer 24 over the cylindrical portions 61, 71 of the bushings 60, 70. As described in more detail below, the yoke insert 82 is folded over the bushings 60, 70 (only one bushing 60 is illustrated in FIG. 8) such that they are embedded in one end of the yoke insert 82.

FIG. 8 further illustrates the secondary layers 26 which are wound around the primary layer 26 in the same manner as illustrated in FIG. 4c. Preferably, the secondary layer 26 is wound so that the resin-coated glass fibers at least partially cover the yoke insert 82 as shown in FIG. 8. This further secures the yoke insert 82 in a closed position over the bushings 60, 70, and further stiffens the ends 112, 114 of the insulator 110.

Figure 9:
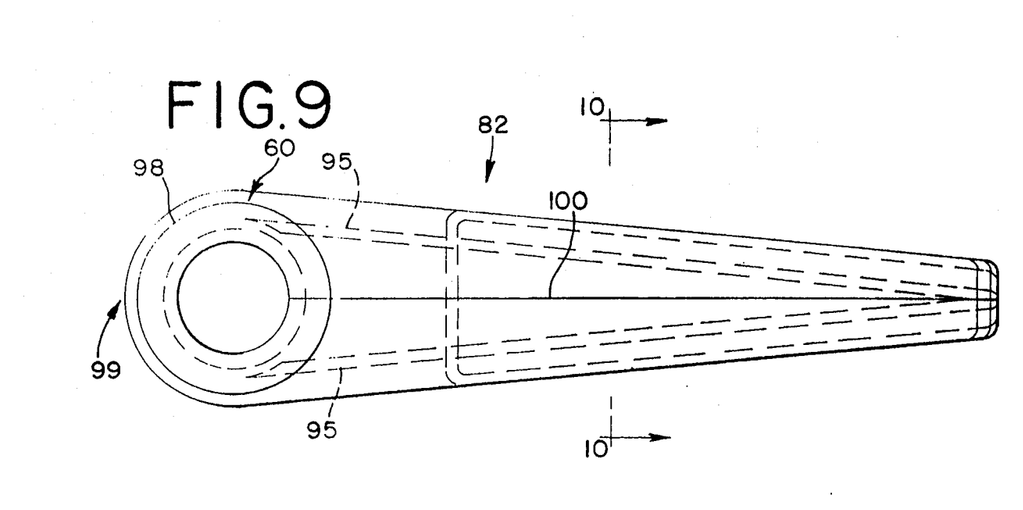
FIG. 9 is a side view of the stiffening insert utilized with the insulator shown in FIGS. 7 and 8.
Figure 10:
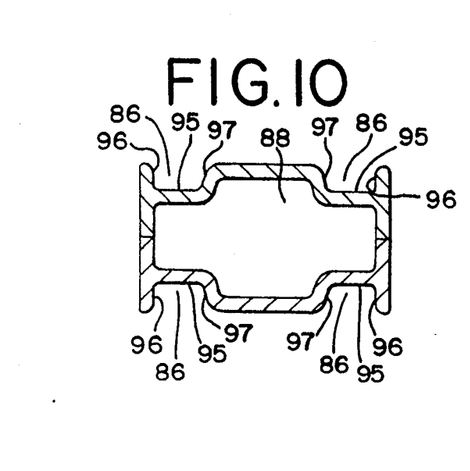
FIG. 10 is a sectional view of the stiffening insert shown in FIG. 9 taken along line 10—10.
Figure 11:
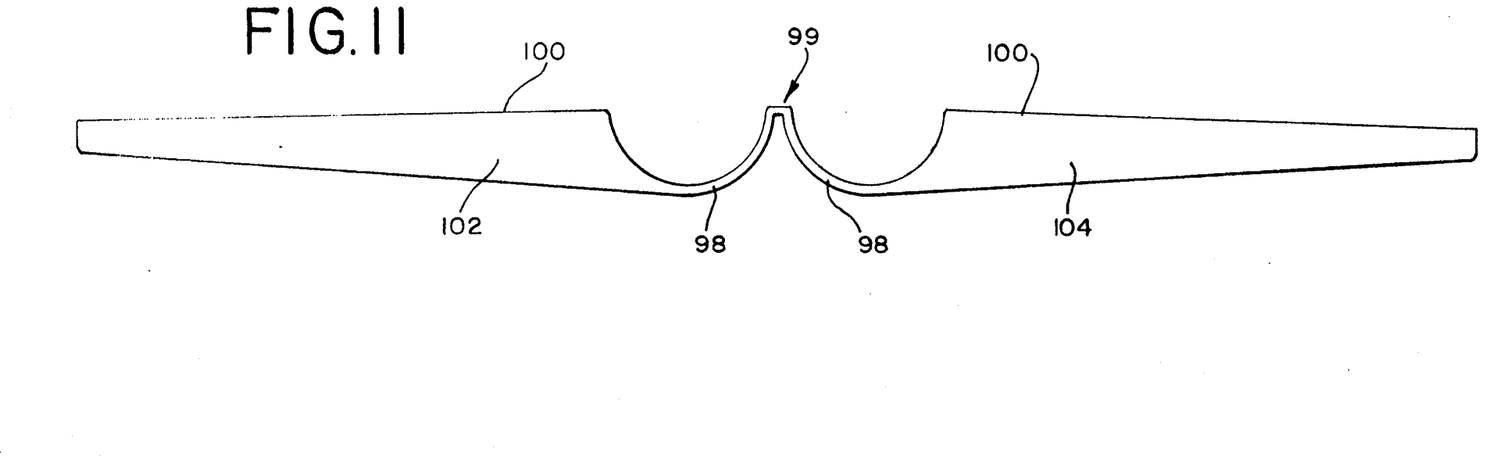
FIG. 11 illustrates the stiffening insert of FIGS. 9 and 10 shown in a pre-assembly position in which the insert has been opened about a hinge on the insert.

Further details of the yoke insert 82 are illustrated in FIGS. 9-11. As best seen in FIGS. 9 and 10, the yoke insert 82 preferably has a hollow interior 88 formed from a wall made of thin yet strong material (preferably plastic). The channels 86 are defined by ramp surfaces 95, outer walls 96, and inner walls 97. At one end of the yoke insert 82, the ramp surfaces 95 end, and the outer walls 96 and inner walls 97 bend angularly to form circular end rings 98 for gripping the flange portions 62, 72 of the bushings 60, 70. The ramp surfaces 95 end at the cylindrical sections 61, 71 when the yoke insert 82 has been folded over the bushings 60, 70.

As illustrated in FIG. 11, the yoke insert 82 includes two halves 102, 104 divided along a longitudinal line 100 and joined at a hinge 99. The bushings 60, 70 are connected to the yoke insert 82 by unfolding the two halves 102, 104 and placing the bushings 60, 70 in the end rings associated with one of the halves 102, 104. The two halves 102, 104 are then folded together such that the upper half 102 contacts the lower half 104, the ramp surfaces 95 contact and lead to the cylindrical portions 61, 71 of the bushings 60, 70, and the end rings 98 grip the flange portions 62, 72 of the bushings 60, 70. A closure means may be provided for securing the two halves 102, 104 together during manufacture.

Thus it can be seen that the preferred embodiments of the invention which are disclosed provide a significantly improved insulator. Because the primary component of the insulator is fiberglass, it is strong and lightweight. The bushings are also extremely light in comparison with conventional fittings and, thus, the overall strength-to-weight ratio of the insulator is high. The insulator is easy to manufacture. The basic construction of the insulator is extremely flexible and can form the basis for a variety of insulators and/or link constructions. The disclosed stiffening inserts add to the insulator's overall strength and torque strength without adding significantly to the insulator's overall weight. The stiffening inserts further provide a convenient structure for guiding and controlling the path of the glass fibers during manufacture.

While preferred embodiments of the invention have been described, it should be understood that the invention is not limited to these embodiments, and modifications may be made without departing from the invention. For example, the yoke end may be formed as a single arm which would be virtually identical to the tongue end, or two yoke ends could be provided. The glass layers could be wound in an overlapping pattern rather than being wound concentrically. The second layer could be helical or crosswound. More than two layers could be included. The strand is preferably continuous throughout the windings but could include several different strands. The component parts of the insulator may be provided in a variety of combinations, for example, with or without stiffening inserts, or eliminating the weathersheds, or replacing the shield layer with a relatively thin protective coating. Also, the bushing-insert combination could be provided as a one-piece component made from a single material combining the properties needed for the bushings and the inserts.

The scope of the invention is defined by the appended claims, and all devices that come within the meaning of claims, either literally or by equivalence, are intended to be embraced therein.

I claim:

1. A composite insulator comprising:
    a) a body comprised of glass fiber;
    b) at least one bushing embedded in said body;
    c) a shield layer around said body;
    d) a plurality of weathersheds on said shield layer; and
    e) at least one stiffening insert embedded in said body;
    f) said body being further comprised of a solid rod portion formed by winding layers of said glass fiber.

2. The composite insulator of claim 1 further characterized by and including:
    g) a plurality of bushings embedded in said body in spaced apart relationship.

3. The composite insulator of claim 2 wherein:
    h) said body is further comprised of glass fibers coated with resin and wound around and between said bushings.

4. The composite insulator of claim 1 wherein:
    g) said rod portion of said body further comprises a first layer of glass fibers wound longitudinally of said body and a second layer of glass fibers wound transversely around said first layer.

5. The composite insulator of claim 4 wherein:
    h) said layers are formed from a single strand of glass fibers.

6. The composite insulator of claim 2 further characterized in that:
    h) said bushings include a first bushing embedded in a first end of said body and a second bushing embedded in a second end of said body;
    i) each of said bushings being spool-shaped so as to have annular flanges at each end and a tubular section in-between.

7. The composite insulator of claim 6 further characterized in that:
    j) said body comprises a first layer of glass fibers wound longitudinally around said first and second bushings, and a second layer of glass fibers wound transversely around said first layer; and
    k) said solid rod portion of said body is located between said first and second bushings and comprised of said first layer of glass fibers and said second layer of glass fibers.

8. The composite insulator of claim 1 wherein:
a) said insert includes at least one channel; and
b) said body is comprised of glass fibers coated with resin and wound through said channel.

9. A composite insulator comprising:
a) a first layer of glass fibers;
b) a second layer of glass fibers wound around said first layer;
c) a rod portion comprised of said first and second layers of glass fiber;
d) a shield layer and weathersheds molded in one piece over said glass fibers; and
e) at least one stiffening insert embedded in said glass fibers.

10. A composite link comprising:
a) a body comprising primarily glass fiber;
b) said body having a plurality of fittings embedded therein;
c) said body further having at least one stiffening insert embedded therein;
d) said fibers being coated with resin and wound around and between said fittings to form a primary layer;
e) said resin coated fibers also being wound around said primary layer to form a secondary layer.

11. The composite link of claim 10 further characterized by and including:
f) a plurality of fittings embedded in said body in spaced apart relationship.

12. The composite link of claim 10 further characterized by and including:
f) said body being comprised of glass fibers coated with resin and wound around and between said fittings.

13. The composite link of claim 10 further characterized by and including:
f) said body comprising a first layer of glass fibers wound longitudinally of said body and a second layer of glass fibers wound transversely around said first layer.

14. A method of manufacturing a composite insulator comprising the steps of:
a) winding a first layer of glass fibers longitudinally around first and second bushings whose axes are spaced from each other;
b) winding a second layer of glass fibers transversely around said first layer to form a solid rod portion from said first and second glass fiber layers; and
c) molding a polymer shield layer over said glass fibers.

15. The method of claim 14 wherein:
d) said bushings are tubular metal components with flanges formed at free ends; and
e) said first layer is wound to a thickness which protrudes above said flanges.

16. The method of claim 14 wherein:
d) said glass fibers are coated with resin prior to winding.

17. The method of claim 14 wherein:
d) said first layer and said second layer are wound continuously from a single strand of said fibers.

18. The method of claim 14 wherein:
d) weathersheds are molded unitarily with said shield layer.

19. The method of claim 14 wherein:
d) a portion of said second layer adjacent said first bushing is wound thicker than the remainder of said second layer.

20. The method of claim 14 wherein:
d) molding of said polymer shield layer is accomplished by injection molding in a cavity between mold sections;
e) said mold sections engaging exposed faces on said bushings to mask them.

21. The method of claim 19 wherein:
d) said second bushings comprise two bushings whose axes are the same; and
e) a core is inserted between inner exposed faces of said two bushings.

22. An insulator comprising:
a) a body comprised of glass fiber, including a solid rod portion formed by winding layers of said glass fiber;
b) at least one bushing embedded in said body; and
c) at least one stiffening insert embedded in said body.

23. The insulator of claim 22 further characterized by and including:
d) a plurality of bushings embedded in said body in spaced apart relationship.

24. The insulator of claim 23 wherein:
e) said body is comprised of glass fibers coated with resin and wound around and between said bushings.

25. The insulator of claim 22 wherein:
d) said body comprises a first layer of glass fibers wound longitudinally of said body and a second layer of glass fibers wound transversely around said first layer.

26. The insulator of claim 25 wherein:
e) said layers are formed from a single strand of glass fibers.

27. The insulator of claim 22 further characterized in that:
d) said bushings include a first bushing embedded in a first end of said body and a second bushing embedded in a second end of said body;
e) each of said bushings being spool-shaped so as to have annular flanges at each end and a tubular section in-between.

28. The insulator of claim 27 further characterized in that:
f) said body comprises a first layer of glass fibers wound longitudinally around said first and second bushings; and
g) a second layer of glass fibers wound transversely around said first layer.

29. The insulator of claim 22 wherein said bushing is further embedded in said at least one stiffening insert.

30. The insulator of claim 22 wherein:
d) said insert includes at least one channel; and
e) said body comprises glass fibers coated with resin and wound through said channel.

31. The invention of claim 30 wherein said insulator comprises a composite guy strain insulator.

* * * * *